(12) United States Patent
Manschitz et al.

(10) Patent No.: US 7,712,746 B2
(45) Date of Patent: May 11, 2010

(54) CHUCK

(75) Inventors: Erwin Manschitz, Germering (DE); Udo Hauptmann, Landsberg (DE)

(73) Assignee: Hilti Aktiengesellschaft, Schaan (LI)

( * ) Notice: Subject to any disclaimer, the term of this patent is extended or adjusted under 35 U.S.C. 154(b) by 825 days.

(21) Appl. No.: 11/592,525

(22) Filed: Nov. 3, 2006

(65) Prior Publication Data
US 2007/0120331 A1    May 31, 2007

(30) Foreign Application Priority Data
Nov. 25, 2005 (DE) ................ 10 2005 000 168

(51) Int. Cl.
*B25D 17/08* (2006.01)

(52) U.S. Cl. .......... 279/37; 279/19; 279/77; 279/82; 279/143; 279/901

(58) Field of Classification Search .......... 279/19–19.7, 279/23.1, 35–37, 77, 82, 143, 901; 409/232; 606/80; *B23B 31/36; B25D 17/08*
See application file for complete search history.

(56) References Cited

U.S. PATENT DOCUMENTS

| | | | | |
|---|---|---|---|---|
| 2,999,407 A * | 9/1961 | De Frangesco | ............ | 173/211 |
| 3,994,504 A * | 11/1976 | Harrison | ............ | 279/19.6 |
| 4,131,165 A * | 12/1978 | Wanner et al. | ............ | 173/48 |
| 4,174,113 A * | 11/1979 | Eckman | ............ | 279/19.4 |
| 4,434,859 A * | 3/1984 | Rumpp et al. | ............ | 173/48 |
| 4,491,444 A * | 1/1985 | Rumpp et al. | ............ | 409/234 |
| 5,199,833 A * | 4/1993 | Fehrle et al. | ............ | 408/239 R |
| 5,437,465 A * | 8/1995 | Vogele et al. | ............ | 279/22 |
| 5,601,560 A * | 2/1997 | Del Rio et al. | ............ | 606/80 |
| 5,603,516 A * | 2/1997 | Neumaier | ............ | 279/19.5 |
| 5,709,393 A * | 1/1998 | von Keudell et al. | ............ | 279/97 |
| 5,984,596 A * | 11/1999 | Fehrle et al. | ............ | 408/226 |
| 6,135,461 A * | 10/2000 | Below et al. | ............ | 279/19.4 |
| 6,179,300 B1 * | 1/2001 | Baumann et al. | ............ | 279/19.4 |
| 6,520,269 B2 * | 2/2003 | Geiger et al. | ............ | 173/117 |
| 6,536,780 B2 * | 3/2003 | Baumann et al. | ............ | 279/19.4 |
| 6,543,789 B2 * | 4/2003 | Frenzel et al. | ............ | 279/74 |
| 6,659,473 B2 * | 12/2003 | Below et al. | ............ | 279/19.4 |
| 6,691,799 B2 * | 2/2004 | Kuhnle et al. | ............ | 173/132 |
| 6,820,700 B2 * | 11/2004 | Funfer et al. | ............ | 173/132 |
| 7,258,349 B2 * | 8/2007 | Frauhammer et al. | ............ | 279/19 |
| 7,360,606 B2 * | 4/2008 | Saur et al. | ............ | 173/29 |
| 7,533,889 B2 * | 5/2009 | Baumann et al. | ............ | 279/19.7 |
| 2006/0006614 A1 * | 1/2006 | Buchholz et al. | ............ | 279/19 |
| 2006/0192350 A1 * | 8/2006 | Kleine et al. | ............ | 279/19.3 |
| 2007/0096404 A1 * | 5/2007 | Frauhammer et al. | ............ | 279/19.4 |
| 2007/0235950 A1 * | 10/2007 | Biedermann et al. | ............ | 279/19 |
| 2009/0051129 A1 * | 2/2009 | Haas | ............ | 279/146 |

FOREIGN PATENT DOCUMENTS

DE    3516542 A    * 11/1986
SU    1590369 A    * 9/1990

* cited by examiner

*Primary Examiner*—Eric A Gates
(74) *Attorney, Agent, or Firm*—Abelman, Frayne & Schwab

(57) ABSTRACT

A chuck, which is releasably connectable with a tool spindle (1), includes a guide sleeve (3) having a plurality of openings (4), a plurality of locking elements formed as tilt segments (5) each having an axially fixedly supported, support part (7) and a radially tiltable locking part (8) extendable into a respective opening (4) of the guide sleeve (3) for engaging the tool spindle (1), and a manually displaceable locking sleeve (6) for radially locking the locking elements.

7 Claims, 1 Drawing Sheet

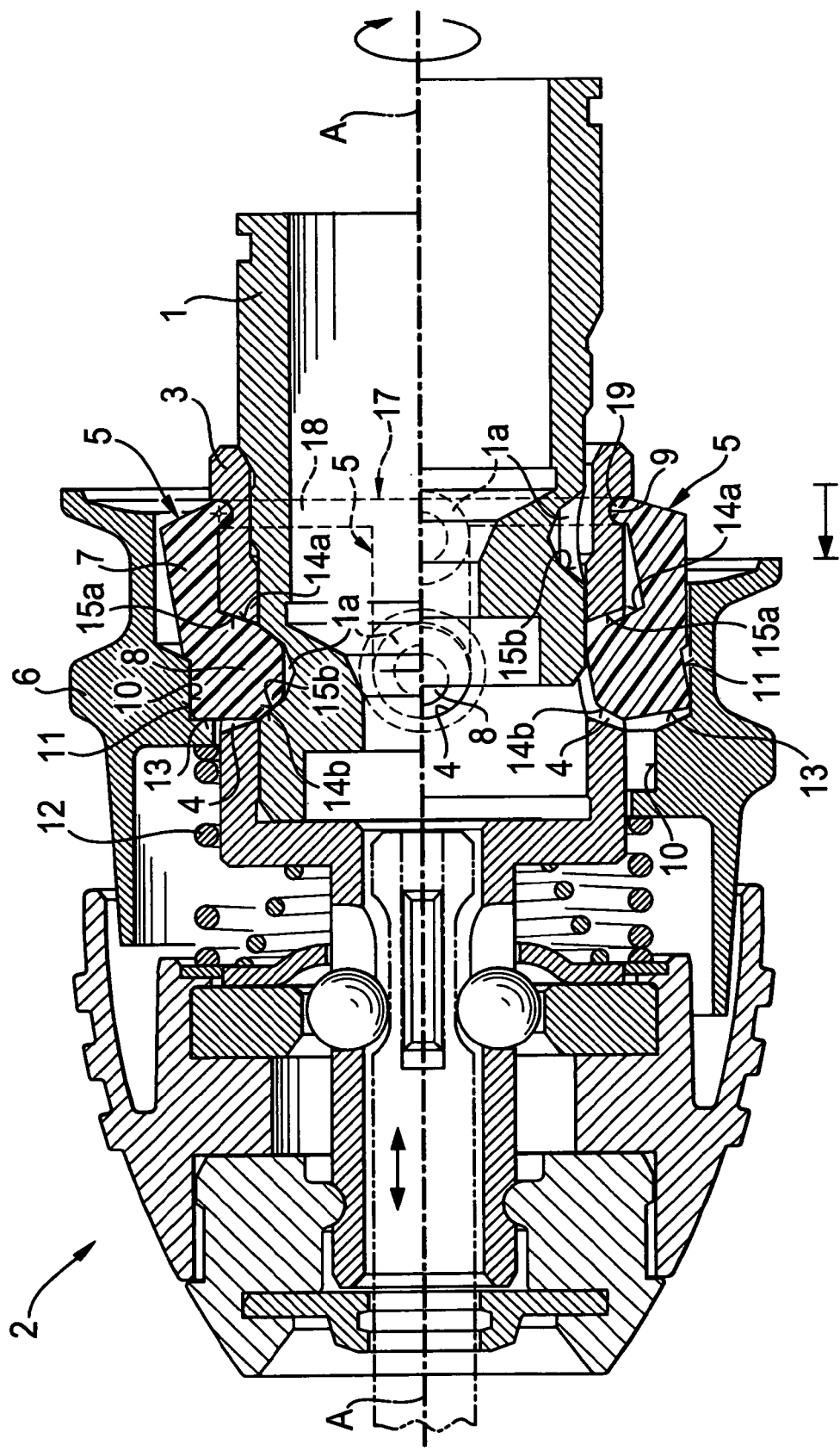

CHUCK

BACKGROUND OF THE INVENTION

1. Field of the Invention

The present invention relates to a chuck releasably connectable with a tool spindle by radially displaceable, engaging locking elements and, in particular, to a chuck for an impact tool for a combination hammer.

2. Description of the Prior Art

Usually, an impact tool chuck is releasably connected with a rotatable tool spindle by a guide sleeve having openings for radially displaceable locking elements engageable in the tool spindle and which are radially locked with manually axially displaceable locking sleeve. According to U.S. Patent Publication US 2003/0188877, with such impact tool chuck, the locking is effected with steel balls, and the transmission of the torque from the spindle to the chuck takes place through engageable with each other radial toothings. In an axially percussion operational mode, steel balls of the chuck, which are axially displaceable in the openings within narrow limits, can cause strong axial oscillations which sporadically release large forces that can cause fatigue of the chuck.

German Utility Model DE 296 12 765 U discloses a chuck in which a loose, radially tiltable locking body engageable in locking grooves of an axially displaceable, within certain limits, impact tool, is combined with a manually axially displaceable, locking sleeve. The transmission of a torque to the impact tool is effected not by the locking body but by entraining webs which engage in entrain grooves of the impact tool.

The object of the present invention is to provide a chuck suitable for a percussion operational mode.

Another object of the present invention is to simplify the chuck construction.

SUMMARY OF THE INVENTION

These and other objects of the present invention, which will become apparent hereinafter, are achieved by providing a chuck releasably connectable with a tool spindle and including a guide sleeve having a plurality of openings, a plurality of locking elements formed as tilt segments each having an axially fixedly supported, support part and a radially tiltable locking part extendable into a respective opening of the guide sleeve for engaging the tool spindle, and a manually displaceable locking sleeve for radially locking the locking elements.

With the axially fixed and only radially tilting locking elements, free axial oscillations are practically prevented. The oscillation energy, which is proportional to a square of the oscillation amplitude, is, thus, substantially smaller.

Advantageously, the tilt segment forms a circular sector (viewed in the longitudinal cross-section) on the support part. The circular sector is supported in a matching associated annular groove of the guide sleeve in an axially fixed condition but is radially tiltable therein.

Advantageously, the tilt segment forms an outer, radially offset slide surface, whereby the tilt segment is locked in two tilting positions as a result of manual displacement of a matching associated, radially offset locking surface of the locking sleeve.

Advantageously, the locking sleeve is resiliently preloaded, whereby the tilting position, in which the chuck can be disengaged from the tool spindle, is unstable.

Advantageously, the locking sleeve is axially displaceable, so that the connection of the chuck with the tool spindle can be easily manually released, without stopping rotation of the spindle.

Advantageously, the tilt segment forms, in the locking part, at least one, oriented radially inwardly, truncated cone surface engageable into a matching associated inner truncated cone surface of the tool spindle. Thereby, surface pressure is applied in both axial and tangential directions, which permits to transmit large forces with small local material stressing.

Advantageously, the tilt segment is formed of a plastic material, in particular, of shock-resistant and high temperature-resistant plastic material such as, e.g., polyarylat (PAR), whereby upon the outer truncated cone surface being pressed against the matching associated inner truncated cone surface of the tool spindle, which is formed of metal, a low-wear, upper position—low position pair is provided. Such a pair is tribologically favorable. The plastic material has, in comparison with metal, a noticeably higher oscillation damping characteristic. Therefore, the transmission of strong shocks from the chuck to the guide sleeve by the tilt segment is interrupted. In addition, with the tilt segment formed of a plastic material, the shock pulse can generate only small natural oscillation amplitude.

Advantageously, all of the tilt segments are circumferentially connected, forming a one-piece tilt segment ring. Further, advantageously, the tilt segment ring is formed on an annular ring which is matchingly associated with the annular groove of the guide sleeve. Thereby, the number of components and the number of mounting or assembly steps necessary for forming the inventive chuck are smaller in comparison with a chuck with a plurality of separate locking elements or bodies.

The novel features of the present invention, which are considered as characteristic for the invention, are set forth in the appended claims. The invention itself, however, both as to its construction and its mode of operation, together with additional advantages and objects thereof, will be best understood from the following detailed description of the preferred embodiment, when read with reference to the accompanying drawings.

BRIEF DESCRIPTION OF THE DRAWINGS

In the Drawings:

Single FIGURE shows a longitudinal cross-sectional view of a chuck according to the present invention.

DETAILED DESCRIPTION OF THE PREFERRED EMBODIMENTS

A chuck 2 according to the present invention for receiving an impact working tool, which is shown in the drawing and is releasably connectable with a hollow tool spindle 1 rotatable about an axis A, includes a guide sleeve 3 having a plurality of openings 4 for a plurality circumferentially arranged, locking elements in form of tilt segments 5 which engage in the tool spindle 1 upon being radially displaced, and a manually displaceable locking sleeve 6 that locks radially the tilt elements 5. The tilt segments 5 have an axially fixed support part 7 and radially displaceable locking part 8 engageable in an opening 4 of the guide sleeve 3. The support part 7 forms, viewed in the longitudinal cross-section, a circular sector 19 that is supported in a matching annular groove 9 in the guide sleeve 3 in an axially stationary position with a possibility of tilting radially relative thereto. A tilt segment 5 forms radially outwardly, a radially offset slide surface 10 that is lockable in both tilt positions "locking position" and "release position" upon manual displacement of the associated radially offset, locking surface 11 of the locking sleeve 6, with the "locking position being shown in the upper half of the drawing and the "release position" being shown in the lower part of the drawing. In the "locking position", the axially displaceable locking sleeve 6 is axially resiliently and steady preloaded by a working tool side spiral spring 12 against a stop 13. The tilt segment 5, which is formed of a shock-resistant and high temperature-resistant polyarylat (PAR) plastic material, forms, in the locking part 8, two truncated cone outer surfaces 14*a*, 14*b* oriented radially inwardly which are pressed, in the "locking position", into associated truncated cone, inner surfaces 15*a*, 15*b* of the guide sleeve 3 and into recesses 1*a* of the cylindrical smooth tool spindle 1, which is formed of metal, transmitting, in addition to the axial forces, the entire torque but preventing transmission of shock pulses of an impact working tool 16 axially percussively displaceable in the chuck 2, to the tool spindle 1. All of the tilt segments 5 are connected with each other to form a one-piece tilt segment ring 17. The tilt segments 5 are formed on a circular ring 18 associated with annular groove 9 of the guide sleeve 3. The tilt segments 18 are connected with each other along a circle and are elastically tilted upon being twisted.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A chuck releasably connectable with a tool spindle (1), the chuck comprising a guide sleeve (3) having a plurality of openings (4); a plurality of locking elements formed as tilt segments (5) each having an axially fixedly supported, support part (7) and a radially tiltable locking part (8) extendable into a respective opening (4) of the guide sleeve (3) for engaging the tool spindle (1); and a manually displaceable locking sleeve (6) for radially locking the locking elements, wherein all of the tilt segments (5) are circumferentially connected with each other, forming a one-piece tilt segment ring (17).

2. A chuck according to claim 1, wherein a the tilt segment (5) forms a circular sector (19) on the support part (7).

3. A chuck according to claim 1, wherein the tilt segment (5) forms an outer, radially offset slide surface (10).

4. A chuck according to claim 1, comprising spring means for preloading the locking sleeve (6).

5. A chuck according to claim 1, wherein the locking sleeve (6) is axially displaceable.

6. A chuck according to claim 1, wherein the tilt segment (5) forms at least one, oriented radially inwardly, truncated cone surface (14*b*) engageable into a matching associated inner truncated cone surface (15*b*) of the tool spindle (1).

7. A chuck according to claim 1, wherein the tilt segment (5) is formed of a plastic material.

\* \* \* \* \*